(12) United States Patent
Poon

(10) Patent No.: US 10,999,652 B2
(45) Date of Patent: May 4, 2021

(54) ENERGY-BASED CURTAILMENT SYSTEMS AND METHODS

(71) Applicant: ENGIE Storage Services NA LLC, Santa Clara, CA (US)

(72) Inventor: Ho Shing Abraham Poon, Mountain View, CA (US)

(73) Assignee: ENGIE STORAGE SERVICES NA LLC, Santa Clara, CA (US)

( * ) Notice: Subject to any disclaimer, the term of this patent is extended or adjusted under 35 U.S.C. 154(b) by 154 days.

(21) Appl. No.: 15/604,582

(22) Filed: May 24, 2017

(65) Prior Publication Data

US 2018/0342867 A1     Nov. 29, 2018

(51) Int. Cl.
| | | |
|---|---|---|
| *H02J 3/00* | (2006.01) | |
| *H04Q 9/00* | (2006.01) | |
| *H02J 13/00* | (2006.01) | |
| *G06Q 50/06* | (2012.01) | |
| *G06Q 30/04* | (2012.01) | |
| *H02J 3/28* | (2006.01) | |

(52) U.S. Cl.
CPC ............. *H04Q 9/00* (2013.01); *G06Q 30/04* (2013.01); *G06Q 50/06* (2013.01); *H02J 3/28* (2013.01); *H02J 13/0006* (2013.01); *H04Q 2209/60* (2013.01)

(58) Field of Classification Search
CPC .......... H02J 13/0006; H02J 3/28; H04Q 9/00; G06Q 30/04; G06Q 50/06
See application file for complete search history.

(56) References Cited

U.S. PATENT DOCUMENTS

| | | | |
|---|---|---|---|
| 1,831,553 | A | 11/1931 | Byles |
| 4,023,043 | A | 5/1977 | Stevenson |
| 4,059,747 | A | 11/1977 | Brody |
| 4,277,691 | A | 7/1981 | Lunn |
| 4,520,274 | A | 5/1985 | Stants |
| 4,731,547 | A | 3/1988 | Alenduff et al. |
| 5,500,561 | A | 3/1996 | Wilhelm |
| 5,644,173 | A | 7/1997 | Elliason et al. |

(Continued)

FOREIGN PATENT DOCUMENTS

| | | |
|---|---|---|
| WO | 0111525 A1 | 2/2001 |
| WO | 2017035258 A1 | 3/2017 |

(Continued)

OTHER PUBLICATIONS

"DOE-2 Engineers Manual," Nov. 1982 (763 pages).

(Continued)

*Primary Examiner* — Ziaul Karim
*Assistant Examiner* — Vincent W Chang
(74) *Attorney, Agent, or Firm* — Dorsey & Whitney LLP

(57) ABSTRACT

Load curtailment systems and methods track energy consumption information about a site over time. The energy consumption information is used to track power levels and to determine whether an energy surplus or an energy deficit accrues for the site based a predetermined setpoint. A load management system is used to offset the deficit or surplus by charging or discharging energy storage in a manner preventing average power draw within at least a subdivision of a utility billing period from exceeding the setpoint, thereby managing demand charges billed by a utility based on power draw of the site.

25 Claims, 4 Drawing Sheets

(56) References Cited

U.S. PATENT DOCUMENTS

| | | |
|---|---|---|
| 5,703,442 A | 12/1997 | Notohamiprodjo et al. |
| 5,798,633 A | 8/1998 | Larsen et al. |
| 5,816,491 A | 10/1998 | Berkeley et al. |
| 5,930,773 A | 7/1999 | Crooks et al. |
| 6,037,758 A | 3/2000 | Perez |
| 6,067,482 A | 5/2000 | Shapiro |
| 6,134,124 A | 10/2000 | Jungreis et al. |
| 6,157,874 A * | 12/2000 | Cooley ............... H02J 3/14 700/22 |
| 6,172,432 B1 | 1/2001 | Schnackenberg et al. |
| 6,476,519 B1 | 11/2002 | Weiner |
| 6,522,031 B2 | 2/2003 | Provanzana et al. |
| 6,542,791 B1 | 4/2003 | Perez |
| 6,563,048 B2 | 5/2003 | Holt et al. |
| 6,618,709 B1 | 9/2003 | Sneeringer |
| 6,652,330 B1 | 11/2003 | Wasilewski |
| 6,671,586 B2 | 12/2003 | Davis et al. |
| 6,728,646 B2 | 4/2004 | Howell et al. |
| 6,785,592 B1 | 8/2004 | Smith et al. |
| 6,868,293 B1 | 3/2005 | Schurr et al. |
| 6,882,904 B1 | 4/2005 | Petrie et al. |
| 6,889,122 B2 | 5/2005 | Perez |
| 6,900,556 B2 | 5/2005 | Provanzana et al. |
| 6,902,837 B2 | 6/2005 | McCluskey et al. |
| 6,977,446 B2 | 12/2005 | MacKay |
| 7,060,379 B2 | 6/2006 | Speranza et al. |
| 7,069,161 B2 | 6/2006 | Gristina et al. |
| 7,122,916 B2 | 10/2006 | Nguyen et al. |
| 7,132,833 B2 | 11/2006 | Layden et al. |
| 7,142,949 B2 | 11/2006 | Brewster et al. |
| 7,171,374 B1 | 1/2007 | Sheehan et al. |
| 7,193,872 B2 | 3/2007 | Siri |
| 7,274,975 B2 | 9/2007 | Miller |
| 7,482,710 B2 | 1/2009 | Ichinose et al. |
| 7,778,738 B2 | 8/2010 | Taft |
| 7,782,021 B2 | 8/2010 | Kelty et al. |
| 7,783,544 B2 | 8/2010 | Horowitz |
| 7,818,226 B2 | 10/2010 | Brawley et al. |
| 7,844,529 B2 | 11/2010 | Ziade et al. |
| 7,863,866 B2 | 1/2011 | Wolf |
| 7,873,441 B2 | 1/2011 | Synesiou et al. |
| 7,894,946 B2 | 2/2011 | Kulyk et al. |
| 7,943,250 B1 | 5/2011 | Johnson et al. |
| 7,949,615 B2 | 5/2011 | Ehlers et al. |
| 8,024,077 B2 | 9/2011 | Torre et al. |
| 8,078,330 B2 | 12/2011 | Brickfield et al. |
| 8,090,600 B2 | 1/2012 | Ziade et al. |
| 8,126,794 B2 | 2/2012 | Lange et al. |
| 8,396,726 B2 | 3/2013 | Ziade et al. |
| 8,417,391 B1 | 4/2013 | Rombouts et al. |
| 8,442,698 B2 | 5/2013 | Fahimi et al. |
| 8,588,989 B1 | 11/2013 | Heath et al. |
| 8,682,491 B2 | 3/2014 | Fakos et al. |
| 8,706,650 B2 | 4/2014 | Ozog |
| 8,761,949 B2 | 6/2014 | Mansfield |
| 8,761,952 B2 | 6/2014 | Forbes |
| 8,912,672 B2 | 12/2014 | Pendray et al. |
| 8,930,269 B2 | 1/2015 | He et al. |
| 8,983,673 B2 | 3/2015 | Chow |
| 9,002,670 B2 | 4/2015 | Hurri et al. |
| 9,003,216 B2 | 4/2015 | Sankar et al. |
| 9,007,027 B2 | 4/2015 | Prosser |
| 9,048,671 B2 | 6/2015 | Prosser |
| 9,235,825 B2 | 1/2016 | Shao |
| 9,312,698 B2 | 4/2016 | Subbotin et al. |
| 9,431,827 B2 | 8/2016 | Chow et al. |
| 9,489,701 B2 | 11/2016 | Emadi et al. |
| 2001/0043013 A1 | 11/2001 | Abe |
| 2002/0120368 A1 | 8/2002 | Edelman et al. |
| 2003/0041016 A1 | 2/2003 | Spool et al. |
| 2003/0055677 A1 | 3/2003 | Brown et al. |
| 2003/0230443 A1 | 12/2003 | Cramer et al. |
| 2004/0024483 A1 | 2/2004 | Holcombe |
| 2004/0084965 A1 | 5/2004 | Welches et al. |
| 2004/0215529 A1 | 10/2004 | Foster et al. |
| 2005/0043862 A1 | 2/2005 | Brickfield et al. |
| 2005/0102068 A1 | 5/2005 | Pimputkar et al. |
| 2005/0138929 A1 | 6/2005 | Enis et al. |
| 2006/0017328 A1 | 1/2006 | Bryde |
| 2006/0276938 A1 | 12/2006 | Miller |
| 2007/0005192 A1 | 1/2007 | Schoettle et al. |
| 2007/0061021 A1 | 3/2007 | Cohen et al. |
| 2007/0103835 A1 | 5/2007 | Sorenson |
| 2007/0156559 A1 | 7/2007 | Wolzenski et al. |
| 2008/0046387 A1 | 2/2008 | Gopal et al. |
| 2008/0114499 A1 | 5/2008 | Hakim et al. |
| 2008/0167756 A1 | 7/2008 | Golden et al. |
| 2008/0172312 A1 | 7/2008 | Synesiou et al. |
| 2008/0183337 A1 | 7/2008 | Szabados |
| 2008/0191675 A1 | 8/2008 | Besser et al. |
| 2008/0203975 A1 | 8/2008 | Burlak et al. |
| 2008/0272934 A1 | 11/2008 | Wang et al. |
| 2008/0281473 A1 | 11/2008 | Pitt |
| 2009/0006279 A1 | 1/2009 | Buettner et al. |
| 2009/0048716 A1 | 2/2009 | Marhoefer |
| 2009/0088907 A1 | 4/2009 | Lewis et al. |
| 2009/0157529 A1 | 6/2009 | Ehlers et al. |
| 2009/0212745 A1 | 8/2009 | Kelty |
| 2009/0216688 A1 | 8/2009 | Kelty et al. |
| 2009/0222143 A1 | 9/2009 | Kempton |
| 2009/0243540 A1 | 10/2009 | Choi et al. |
| 2009/0254396 A1 | 10/2009 | Metcalfe |
| 2009/0307117 A1 | 12/2009 | Greiner et al. |
| 2009/0317694 A1 | 12/2009 | Ängquist et al. |
| 2010/0017045 A1 | 1/2010 | Nesler et al. |
| 2010/0023337 A1 | 1/2010 | Case |
| 2010/0072947 A1 | 3/2010 | Chan et al. |
| 2010/0114389 A1 | 5/2010 | Chatterton et al. |
| 2010/0145534 A1 | 6/2010 | Forbes et al. |
| 2010/0174419 A1 | 7/2010 | Brumfield et al. |
| 2010/0174643 A1 | 7/2010 | Schaefer et al. |
| 2010/0217550 A1 | 8/2010 | Crabtree et al. |
| 2010/0217642 A1 | 8/2010 | Crubtree et al. |
| 2010/0253244 A1 | 10/2010 | Snook et al. |
| 2010/0262296 A1 | 10/2010 | Davis et al. |
| 2010/0271802 A1 | 10/2010 | Recker et al. |
| 2010/0274602 A1 | 10/2010 | Kaufman et al. |
| 2010/0280978 A1 | 11/2010 | Shimada et al. |
| 2010/0283606 A1 | 11/2010 | Tsypin et al. |
| 2010/0286937 A1 | 11/2010 | Hedley et al. |
| 2010/0295514 A1 | 11/2010 | Burlak et al. |
| 2010/0301771 A1 | 12/2010 | Chemel et al. |
| 2010/0301773 A1 | 12/2010 | Chemel et al. |
| 2010/0324962 A1 | 12/2010 | Nesler et al. |
| 2010/0327800 A1 | 12/2010 | Reineccius |
| 2010/0332373 A1 | 12/2010 | Crabtree et al. |
| 2011/0004358 A1 | 1/2011 | Pollack et al. |
| 2011/0022419 A1 | 1/2011 | Ziade et al. |
| 2011/0035061 A1 | 2/2011 | Altonen et al. |
| 2011/0040666 A1 | 2/2011 | Crabtree et al. |
| 2011/0046806 A1 | 2/2011 | Nagel et al. |
| 2011/0046904 A1 | 2/2011 | Souilmi |
| 2011/0082598 A1 | 4/2011 | Boretto et al. |
| 2011/0133655 A1 | 6/2011 | Recker et al. |
| 2011/0137481 A1 | 6/2011 | Manz et al. |
| 2011/0166710 A1 | 7/2011 | Kordik et al. |
| 2011/0173109 A1 | 7/2011 | Synesiou et al. |
| 2011/0184574 A1 | 7/2011 | Roux et al. |
| 2011/0193518 A1 | 8/2011 | Wright et al. |
| 2011/0196692 A1 | 8/2011 | Chavez et al. |
| 2011/0204720 A1 | 8/2011 | Ruiz et al. |
| 2011/0208369 A1 | 8/2011 | Yang et al. |
| 2011/0231320 A1 | 9/2011 | Irving |
| 2011/0251933 A1 | 10/2011 | Egnor et al. |
| 2011/0301894 A1 | 12/2011 | Sanderford |
| 2011/0309799 A1 | 12/2011 | Firehammer |
| 2012/0010757 A1 | 1/2012 | Francino et al. |
| 2012/0016528 A1 | 1/2012 | Raman et al. |
| 2012/0029720 A1 | 2/2012 | Cherian et al. |
| 2012/0035777 A1 | 2/2012 | Park |
| 2012/0059607 A1 | 3/2012 | Rebec et al. |
| 2012/0061963 A1 | 3/2012 | Thisted |
| 2012/0065789 A1 | 3/2012 | Scelzi et al. |
| 2012/0065792 A1 | 3/2012 | Yonezawa et al. |

(56) References Cited

U.S. PATENT DOCUMENTS

| | | |
|---|---|---|
| 2012/0074780 A1 | 3/2012 | Fleck |
| 2012/0083930 A1 | 4/2012 | Ilic et al. |
| 2012/0101639 A1 | 4/2012 | Carralero et al. |
| 2012/0101921 A1 | 4/2012 | Anderson et al. |
| 2012/0130556 A1 | 5/2012 | Marhoefer |
| 2012/0185105 A1 | 7/2012 | McMullin |
| 2012/0197452 A1 | 8/2012 | Matthews et al. |
| 2012/0242148 A1 | 9/2012 | Galati |
| 2012/0245744 A1 | 9/2012 | Prosser et al. |
| 2012/0245751 A1 | 9/2012 | Gow et al. |
| 2012/0310416 A1 | 12/2012 | Tepper et al. |
| 2013/0018821 A1 | 1/2013 | Shao |
| 2013/0024342 A1 | 1/2013 | Horowitz et al. |
| 2013/0030590 A1 | 1/2013 | Prosser |
| 2013/0030595 A1 | 1/2013 | Chow et al. |
| 2013/0047010 A1 | 2/2013 | Massey et al. |
| 2013/0060719 A1 | 3/2013 | Burke et al. |
| 2013/0085614 A1 | 4/2013 | Wenzel et al. |
| 2013/0117004 A1 | 5/2013 | Schultz et al. |
| 2013/0134780 A1 | 5/2013 | Parsonnet |
| 2013/0173191 A1 | 7/2013 | McDonald et al. |
| 2013/0190939 A1 | 7/2013 | Lenox |
| 2013/0226544 A1 | 8/2013 | Mcconaghy et al. |
| 2013/0232151 A1 | 9/2013 | Shao |
| 2013/0271083 A1 | 10/2013 | Williams |
| 2013/0274935 A1 | 10/2013 | Deshpande et al. |
| 2013/0285610 A1 | 10/2013 | Katou et al. |
| 2013/0297092 A1 | 11/2013 | Willig et al. |
| 2013/0325197 A1 | 12/2013 | Mansfield |
| 2014/0019171 A1 | 1/2014 | Koziol |
| 2014/0039710 A1 | 2/2014 | Carter et al. |
| 2014/0067140 A1 | 3/2014 | Gow |
| 2014/0070756 A1 | 3/2014 | Kearns et al. |
| 2014/0074306 A1 | 3/2014 | Lu et al. |
| 2014/0122906 A1 | 5/2014 | Whitted et al. |
| 2014/0152007 A1 | 6/2014 | Sterregaard et al. |
| 2014/0163755 A1 | 6/2014 | Potter et al. |
| 2014/0379160 A1 | 12/2014 | Fallon |
| 2015/0015213 A1 | 1/2015 | Brooks et al. |
| 2015/0025917 A1 | 1/2015 | Stempora |
| 2015/0094965 A1 | 4/2015 | Schneider et al. |
| 2015/0295449 A1 | 10/2015 | Prosser |
| 2016/0006245 A1 | 1/2016 | Chow |
| 2016/0055412 A1 | 2/2016 | Carroll et al. |
| 2016/0161932 A1 | 6/2016 | Shao |
| 2016/0360336 A1 | 12/2016 | Gross et al. |
| 2017/0038786 A1 | 2/2017 | Asghari et al. |
| 2017/0060162 A1 | 3/2017 | Holzman et al. |
| 2017/0063083 A1 | 3/2017 | Holzman |
| 2017/0098229 A1 | 4/2017 | Vickery et al. |
| 2017/0098279 A1 | 4/2017 | Vickery et al. |
| 2017/0099056 A1 | 4/2017 | Vickery et al. |
| 2017/0102726 A1 | 4/2017 | Goldsmith |
| 2017/0243139 A1 | 8/2017 | Dzierwa et al. |
| 2017/0324256 A1 | 11/2017 | Mcmorrow et al. |
| 2017/0331290 A1* | 11/2017 | Burlinson ................ G05F 1/66 |
| 2018/0358835 A1* | 12/2018 | Tian ...................... H02M 3/335 |

FOREIGN PATENT DOCUMENTS

| | | |
|---|---|---|
| WO | 2017040586 A1 | 3/2017 |
| WO | 2017059340 A1 | 4/2017 |
| WO | 2017059345 A1 | 4/2017 |
| WO | 2017059350 A1 | 4/2017 |

OTHER PUBLICATIONS

Author Unknown, "Load aggregation of multiple facilities," published at "http://www.obvius.com/applicationnotes.php," (4 pages).

Author Unknown, "Load Curtailment/Demand Response," published at "http://www.obvius.com/applicationnotes.php," (4 pages).

International Search Report for International Patent Application No. PCT/US2016/048448, dated Nov. 18, 2016 (2 pages).

International Search Report for International Patent Application No. PCT/US2016/049587, dated Nov. 15, 2016 (2 pages).

International Search Report for International Patent Application No. PCT/US2016/054965, dated Nov. 16, 2016 (4 pages).

International Search Report for International Patent Application No. PCT/US2016/054973, dated Nov. 16, 2016 (4 pages).

International Search Report International Patent Application No. PCT/US2016/054983, dated Nov. 16, 2016 (4 pages).

Norris et al.,"NAS Battery Demonstration at American Electric Power: A Study for the DOE Energy Storage Program," Sandia Report, Mar. 2007, pp. 1-55.

Pedrasa et al.,"Robust Scheduling of Residential Distributed Energy Resources Using a Novel Energy Service Decision-Support Tool," IEEE, 2011 (8 pages).

Craft, "Local Energy Management Through Mathematical Modeling and Optimization," 2004 (223 pages).

Iman et al., "A Distribution-Free Approach to Inducing Rank Correlation Among Input Variables," Communications in Statistics—Stimulation and Computation, 1982, pp. 311-334, vol. 11, No. 3.

Jeon et al., "Using deferrable demand in a smart grid to reduce the cost of electricity for customers", Journal of Regulatory Economics, Springer Science+Business Media New York. (Year:2015).

Johnson et al., "Renewable Generation Capacity and Wholesale Electricity Price Variance", Energy Journal, International Association for Energy Economics, Inc. (Year: 2019).

Stylianos et al., "Optimal Bidding Strategy for Electric Vehicle Aggregators in Electricity Markets", IEEE Transactions on Power Systems, vol. 28, No. 4, (Nov. 2013).

\* cited by examiner

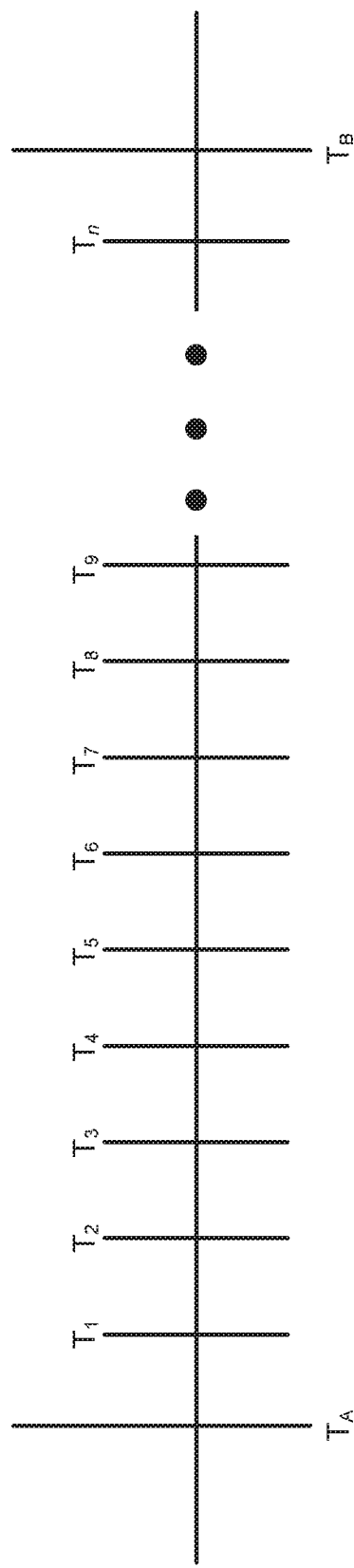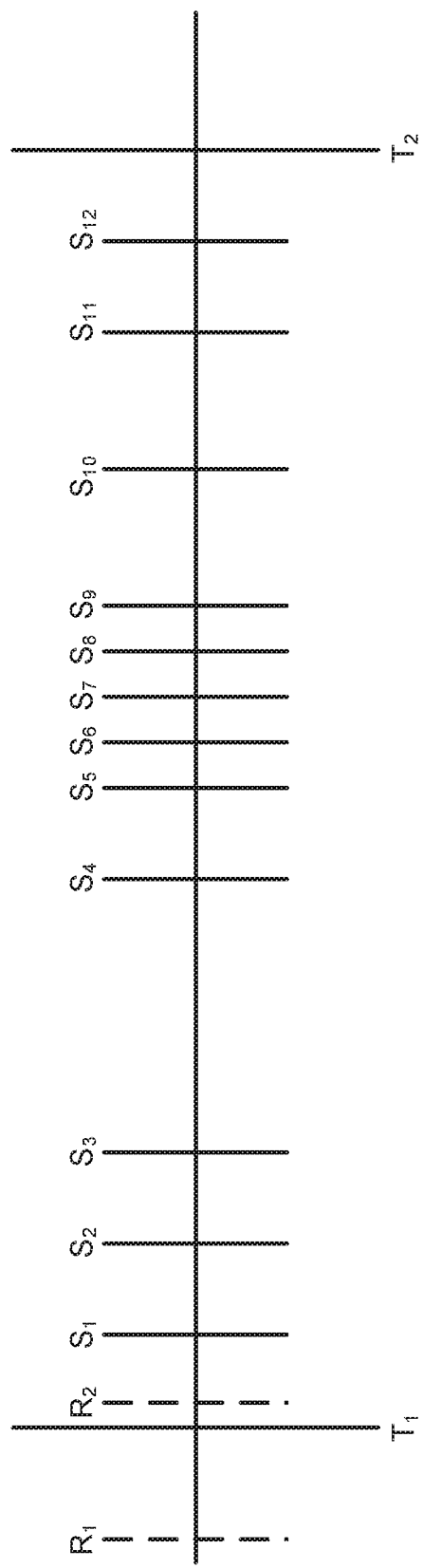

ENERGY-BASED CURTAILMENT SYSTEMS AND METHODS

TECHNICAL FIELD

The present disclosure generally relates to the field of electrical utility usage mitigation and optimization using energy storage systems and related fields.

BACKGROUND

Electrical energy and power generation and distribution has been a mainstay for residential and commercial energy needs all over the world and for many years. Various forms of electrical energy generation have been devised, including coal fired power plants, nuclear power plants, hydroelectric plants, wind harness plants, and others. All of these forms of electrical energy generation are well known to those of skill in the art of power generation and details of their operation need not be set forth herein.

As power generation has advanced, power usage has increased. Due to advances in technology and cultural factors, the demand for electrical energy steadily rises. Energy production facilities and distributors such as electrical utility providers therefore meet the rising demand for electricity with greater production capabilities. However, utility providers do not need to provide the same magnitude of electrical power to consumers at all times. Consumer needs greatly fluctuate based on the time of day, time of year, and other related factors. Therefore, utility providers have implemented programs wherein they charge more per watt of energy consumed during predetermined periods of time when overall consumer demand is expected to be higher than usual. These programs are referred to herein as "time-of-use" energy billing programs. These programs help the providers offset their costs of operating peaking power plants that are primarily brought online during those high-demand periods of time, and are not typically directly associated with the activity of any single consumer.

Utility providers have also implemented programs to charge consumers for consuming energy at high power levels. Under these programs, the consumer is billed a "demand charge" that is based on and directly related to the highest magnitude of power drawn from the grid at some point during a billing period. Therefore, these programs are referred to herein as "demand charge" energy billing programs. The magnitude of the power level used to determine the demand charge may be determined in a number of ways, and the most common methods of calculation are based on measuring the instantaneous power draw of the site at any point in time over the billing period (or within a subdivision of the billing period) or an average power draw of the site over a period of time within the billing period. For example, under the average power draw scheme, the utility provider measures the average consumption of the consumer's site over a plurality of time periods (e.g., consecutive 15-minute spans of time) within the billing period (e.g., one month), and the highest average power during one of those time periods is the basis for the demand charge for that billing period. Consumers are constantly in need of ways to limit utility costs and to improve the efficiency of their consumption of utility power.

SUMMARY

One aspect of the present disclosure relates to a method of managing electrical utility consumption based on tracking and responding to energy consumption signals. In one embodiment, the method may comprise receiving a first energy tracking notification from a utility meter at a customer site at a first time. This utility meter may be connected to a utility distribution grid. The method may further comprise receiving a second energy tracking notification from the utility meter at a second time, wherein the second energy tracking notification may be sent after a quantity of energy is consumed by the customer site from the utility distribution grid. Next, the method may comprise determining a representative power level of the customer site drawn from the utility distribution grid between the first time and the second time based on the quantity of energy, determining an energy surplus or deficit based on a difference between the representative power level and a target power level, and operating a load curtailment system to transfer energy to or from the utility distribution grid. The energy transferred may offset the energy surplus or deficit within a subdivision of a billing period.

In some embodiments, the representative power level is an average power level drawn by the customer site between the first time and the second time. The first and second energy tracking notifications may be received within the subdivision of the billing period. That subdivision may have a duration of about 15 minutes or less. The load curtailment system may also comprise an energy storage device.

In some configurations, the method may further comprise tracking a duration of transferring energy to or from the utility distribution grid using the load curtailment system and stopping the energy transfer once the energy deficit or surplus should have been eliminated via the energy transfer. Operating the load curtailment system may comprise transferring energy at a single power level until the energy transferred offsets the energy surplus or deficit. The first energy tracking notification may be received prior to a start time of the subdivision of the billing period. The first energy tracking notification may also be received after a start time of the subdivision of the billing period. The load curtailment system may be charged or discharged over a fraction of a remaining time between the second time and an end of the subdivision of the billing period, and in some cases the quantity of energy may be no greater than an amount of energy consumed at the target power level over about one tenth of a total duration of the subdivision of the billing period.

Another aspect of the disclosure relates to a non-transitory computer-readable medium storing code for controlling a load curtailment system. The code may comprise instructions executable by a processor to: receive a first energy tracking notification from a utility meter at a customer site at a first time, with the utility meter being connected to a utility distribution grid, receive a second energy tracking notification from the utility meter at a second time, with the second energy tracking notification being sent after a quantity of energy is consumed by the customer site from the utility distribution grid, determine a representative power level of the customer site drawn from the utility distribution grid between the first time and the second time based on the quantity of energy, determine an energy surplus or deficit based on a difference between the representative power level and a target power level, and operate a load curtailment system to transfer energy to or from the utility distribution grid. The energy transferred may offset the energy surplus or deficit within a subdivision of a billing period.

Yet another aspect of the disclosure relates to an apparatus for controlling a load curtailment system. The apparatus may comprise a processor, memory in electronic communication with the processor, and instructions stored in the memory, wherein instructions may be executable by the processor to receive a first energy tracking notification from a utility meter at a customer site at a first time, with the utility meter being connected to a utility distribution grid, receive a second energy tracking notification from the utility meter at a second time, with the second energy tracking notification being sent after a quantity of energy is consumed by the customer site from the utility distribution grid, determine a representative power level of the customer site drawn from the utility distribution grid between the first time and the second time based on the quantity of energy, determine an energy surplus or deficit based on a difference between the representative power level and a target power level, and operate a load curtailment system to transfer energy to or from the utility distribution grid. The energy transferred may offset the energy surplus or deficit within a subdivision of a billing period.

The above summary of the present invention is not intended to describe each embodiment or every implementation of the present invention. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 2 is a timeline diagram illustrating the duration of a billing period and a plurality of subdivisions in a billing period.

FIG. 3 is a timeline diagram illustrating the duration of a subdivision of a billing period.

Figure 1:
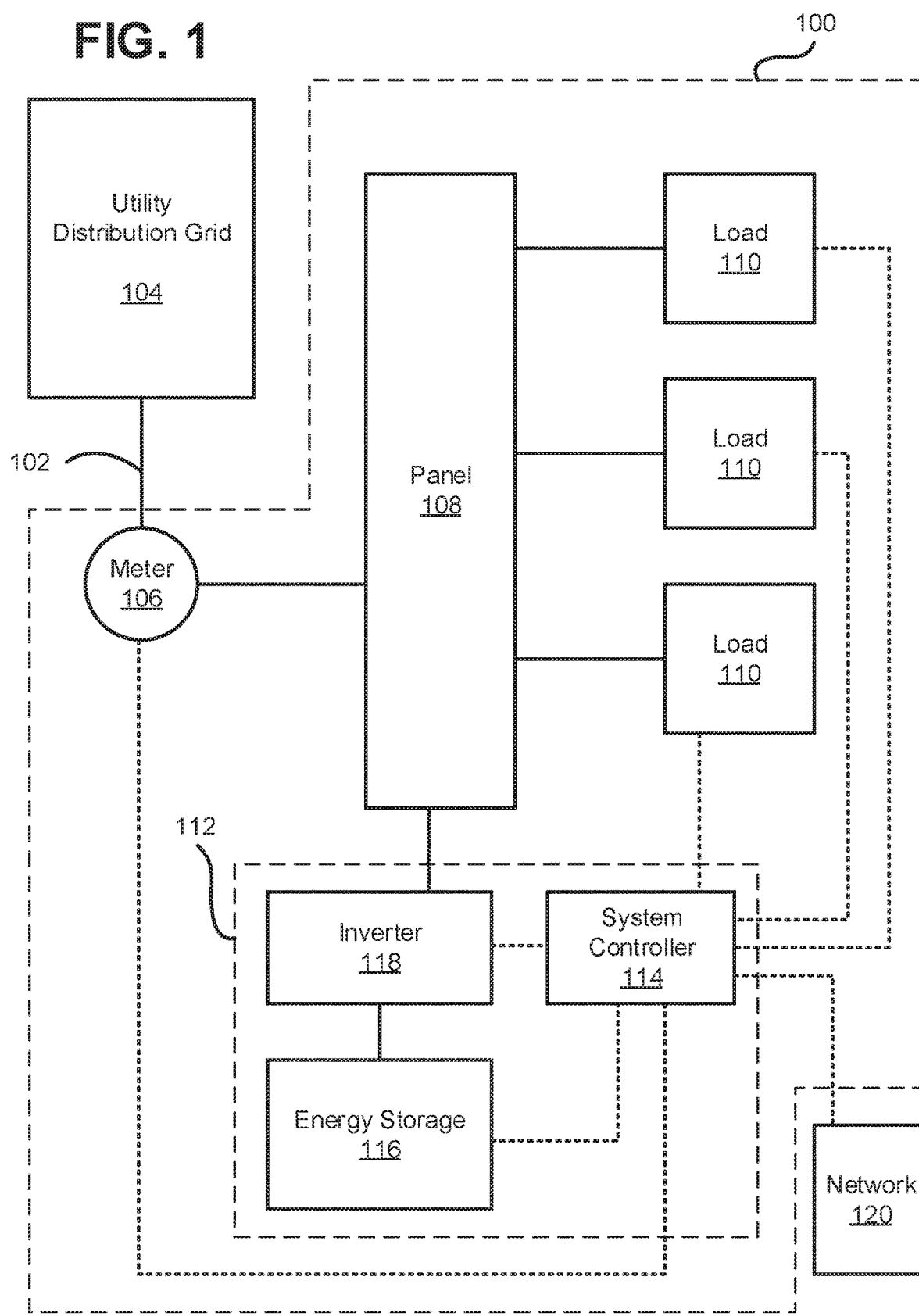
FIG. 1 is a schematic diagram illustrating a utility consumer site according to an embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Consumers that are billed high demand charges often take measures to mitigate those charges. Some popular mitigation techniques include load shedding, supplemental electricity generation, and energy storage load control. When using energy storage load control, the consumer may discharge an energy storage system to provide power to consumer load during periods of time in which the power drawn from the utility grid would be high and may recharge the energy storage system at times when the power draw from the grid is lower than usual so that the energy storage has enough charge to offset loads when a new peak power draw occurs.

Conventional energy storage load control systems are prone to costly failures. They are reactive, meaning the system monitors the instantaneous power draw of the site from the grid and, if the power draw exceeds a certain "setpoint" threshold of power draw, the system reactively discharges energy storage to prevent the power draw from increasing the maximum recorded power draw that would be used to calculate the demand charge. These kinds of reactive systems are unreliable for reducing demand charges because inverters used to convert the energy stored by the energy storage device into power available to loads at the site cannot immediately react to commands. Therefore, the power level of consumption at the site may exceed the setpoint before the energy storage system is able to react appropriately. Also, for many load profiles, the power draw changes quickly, and the energy storage load control system is not well equipped to react when the power draw frequently changes above and below the setpoint of the site because it leads to excessive battery cycling between charge and discharge. The high amount of cycling leads to wear and tear on batteries and other components. Also, the slow reaction time of the system may lead to back-feeding energy into the meter and other wasteful usage of stored energy. Accordingly, there is a need for improvements and innovation in the field of electrical utility usage mitigation and optimization using energy storage systems.

In some cases, utility providers assess demand charges based on the average power draw over portions of a billing period rather than assessing demand charges based on the maximum instantaneous or short-term power draw at any given moment within a billing period. Generally, the total time in the billing period is divided into a plurality of segments or subdivisions, and the utility provider determines the average power draw of the consumer in each individual subdivision. At the end of the billing period, the customer may then be charged a demand charge based on the average value that is the highest for that billing period. For example, the utility provider may divide the billing period into 15-minute increments and may determine average power levels of the consumer's site for each of the 15-minute increments. The highest average power level (corresponding to one of the 15-minute increments) may then be used to determine the demand charge assessed for that billing period.

The present disclosure generally relates to methods, apparatuses, and systems used to manage electrical utility consumption, including, for example, electrical utility consumption that results in grid power level-based demand charges from an electrical utility provider. Therefore, some systems and methods of the present disclosure are configured to track and control the average power level of the plurality of subdivisions of the billing period in order to manage the demand charge assessed by the provider. Because the average load needs to be managed rather than the instantaneous load, the load control system does not always need to immediately charge or discharge to react to peaks that occur in the power draw of the site from the grid. Also, the average load may be advantageous to track and control because it is generally more predictable than the instantaneous power draw of the consumer.

Some consumers use utility load controllers that track the average power draw in order to manage demand charges. These controllers operate in a hybrid mode wherein battery cycling and switching is reduced by using a combination of instantaneous peak shaving and management of an "energy deficit" tracked for each subdivision of a billing period. These hybrid systems may receive measurements of the instantaneous power draw of the site from the grid and may instantaneously respond to the power level by charging or discharging the energy storage to keep the power level from exceeding the setpoint of the billing period. They may also use the measurements of the instantaneous power draw and use predictive algorithms to extrapolate near term power consumption and average consumption, thereby making energy storage charging and discharging decisions less erratic and unpredictable by tracking and managing the average consumption as well.

The utility consumer may also have access to information from the utility provider (e.g., from the utility meter), wherein the utility meter produces a signal for the customer each time a predetermined quantity of energy is consumed by the customer's site from the utility grid. Using these energy consumption signals as guideposts, an energy storage consumption management system may track the amount of grid-based energy consumed by the site over time, and the power draw over that time can be back-calculated from the energy value.

Because the average power draw is used by the utility provider to determine the demand charge, consumption management systems such as those described in the present disclosure may feed energy to the grid that offsets any energy "surplus" amount that would make the average power draw (over a specific subdivision of the billing period) to be greater than the setpoint at the end of the subdivision and thereby cause a new or increased demand charge. Similarly, if there is an energy "deficit" amount that would make the average power draw be less than the setpoint at the end of the subdivision, the system may draw energy from the grid to offset the deficit, such as in situations when energy storage needs to be recharged. The energy fed into the grid to offset the deficit or surplus may be fed before or after a peak in power draw occurs. Thus, the reaction time of the energy storage consumption management system is not as important as in conventional systems. The present systems and methods may therefore be referred to as energy-based load management systems because they are solely reliant on managing consumption based on energy consumption signals rather than power-based or power- and energy-based "hybrid" load management systems.

Typically, the utility provider determines the quantity of energy consumed (i.e., the "energy quantum" or "quantum value") between the signals (i.e., "ticks") from the utility meter that indicate that energy consumption has occurred. Therefore, accurate predictions of future energy consumption based on the timing of those ticks is highly dependent upon the size of the quantum value relative to the power draw of the site. During instances of very high power draw, ticks from the meter come relatively quickly and regularly because a relatively large amount of energy is being consumed over time. When power draw drops to a relatively low level, the ticks either cease or come more slowly. A sudden drop from high to low demand may be interpreted by a load controller as a loss of connectivity to the meter, resulting in a continuation of peak shaving activity (e.g., discharging energy storage) when it is unnecessary. This may be referred to herein as "back-feeding" the meter. Back-feeding may deplete the energy storage and cause unnecessary discharging costs to alleviate non-existent high demand.

Apparatuses, systems, and methods of the present disclosure logic may in some cases address these issues by using a completely energy-based calculation to control energy storage charging and discharging while managing the power level used to calculate demand charges. The present systems and methods may recalculate power commands when an energy measurement tick or signal is updated and received, and may not rely on extrapolated power consumption values, thereby eliminating operational edge cases where predicted consumption may lead the controller to spiral out of control. Commands to charge or discharge the energy storage may be configured to eliminate an energy surplus or deficit observed based on the consumption curtailment setpoint and an energy measurement at the beginning of a subdivision (e.g., a 15-minute span) of the billing period. The system may also track how long it has been operating at the latest power command, and may be configured to stop the system once the deficit or surplus of energy should have been eliminated, thereby eliminating runaway charging or discharging events. This may also avoid scenarios where the system response is so large that it causes the site to back-feed or consume energy at a severely depressed rate, which may essentially stop the energy based meter updates and cause old control commands to follow extrapolated power values (which can be very high) and to provoke a huge discharge response that can detrimentally completely discharge the energy storage.

In some embodiments, the utility meter may provide instant power and energy signals or reports. Embodiments of the systems and methods of this disclosure may be used with these instant signals by having the system controller interpret these instant reports as if they were tick-based reports with a very small quantum value.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Additional detail and embodiments will be provided with reference to the figures. FIG. 1 illustrates a utility consumer site 100 having a connection 102 to a utility distribution grid 104 through a utility meter 106. A utility connection panel 108 may facilitate connection of a plurality of loads 110 to the meter 106. Thus, the loads 110 may receive power from the grid 104 through the meter 106 and the panel 108.

The site 100 may have at least one consumption management system 112 connected to the meter 106, panel 108, and/or loads 110. The consumption management system 112 may alternatively be referred to as a load curtailment system. The consumption management system 112 may comprise a system controller 114 in electronic communication with an energy storage system (ESS) 116 and an inverter 118 (or other converter apparatus). The consumption management system 112 may have a wired or wireless connection to any of the other components at the site 100. In FIG. 1, the consumption management system 112 has solid connection lines indicating an electrical load-bearing connection between components and dashed connection lines indicating a signal-bearing connection between components. In some arrangements, signals and loads may be transferred through the same electrical lines between components. In some embodiments, a plurality of consumption management systems 112 may be located at the site 100.

The system controller 114 may receive information from the meter 106, loads, 110, energy storage 116, inverter 118, and any other components at the site 100. The system controller 114 may also have a connection to a network 120 such as, for example, the Internet, via a network connection or other transceiver apparatus. The system controller 114 may therefore be in one-way or two-way connection with a remote location to report information or receive instructions. The system controller 114 may comprise a computing device configured to send and receive electronic signals and to execute instructions stored in a memory device using a processor. See FIG. 5 and its associated descriptions herein.

The energy storage 116 may alternatively be referred to as a load curtailment device or an energy storage system (ESS). The energy storage 116 may comprise a storage device for electrical energy, such as, for example, a battery bank, capacitor bank, flywheel system, or other related energy storage system capable of being charged by electrical energy and discharged to provide electrical energy. The inverter 118 may link the energy storage 116 to the panel 108. For example, the inverter 118 may comprise a two-way DC-AC inverter that allows the energy storage 116 to provide AC power to the panel 108 or to charge the energy storage 116 with DC power. In some embodiments, converters other than an inverter may be used, or the inverter 118 may be omitted, depending on the electrical system being used at the site 100. Accordingly, the energy storage 116 and inverter 118 are shown here for example purposes, but other devices and combinations of devices may be used by those having skill in the art to implement the functions and features of embodiments the present disclosure.

The energy storage 116 may be charged to draw energy from the utility distribution grid 104 or may be discharged to provide energy to the utility distribution grid 104. When charging, the energy storage 116 may increase the consumption recorded from the grid 104 at the meter 106, and when discharging, the energy storage 116 may decrease consumption recorded from the grid 104 via the meter 106. In this manner, discharging the energy storage 116 may reduce the recorded power draw of the site 100 (e.g., the recorded power draw of the loads 110 from the grid 104) that would be used to determine a demand charge for the consumer. Charging the energy storage 116 may increase the recorded power draw of the site 100.

Thus, when the average power draw of the site within a subdivision of a billing period exceeds a predetermined setpoint (i.e., there is an energy surplus), the energy storage 116 may be discharged during that subdivision to drive down and reduce the average power draw during that subdivision. If the average power draw is below the setpoint within the subdivision, the energy storage 116 may be charged from the grid 104 in a manner that drives up the average power draw within the subdivision without causing the average to exceed the setpoint.

Figure 4:
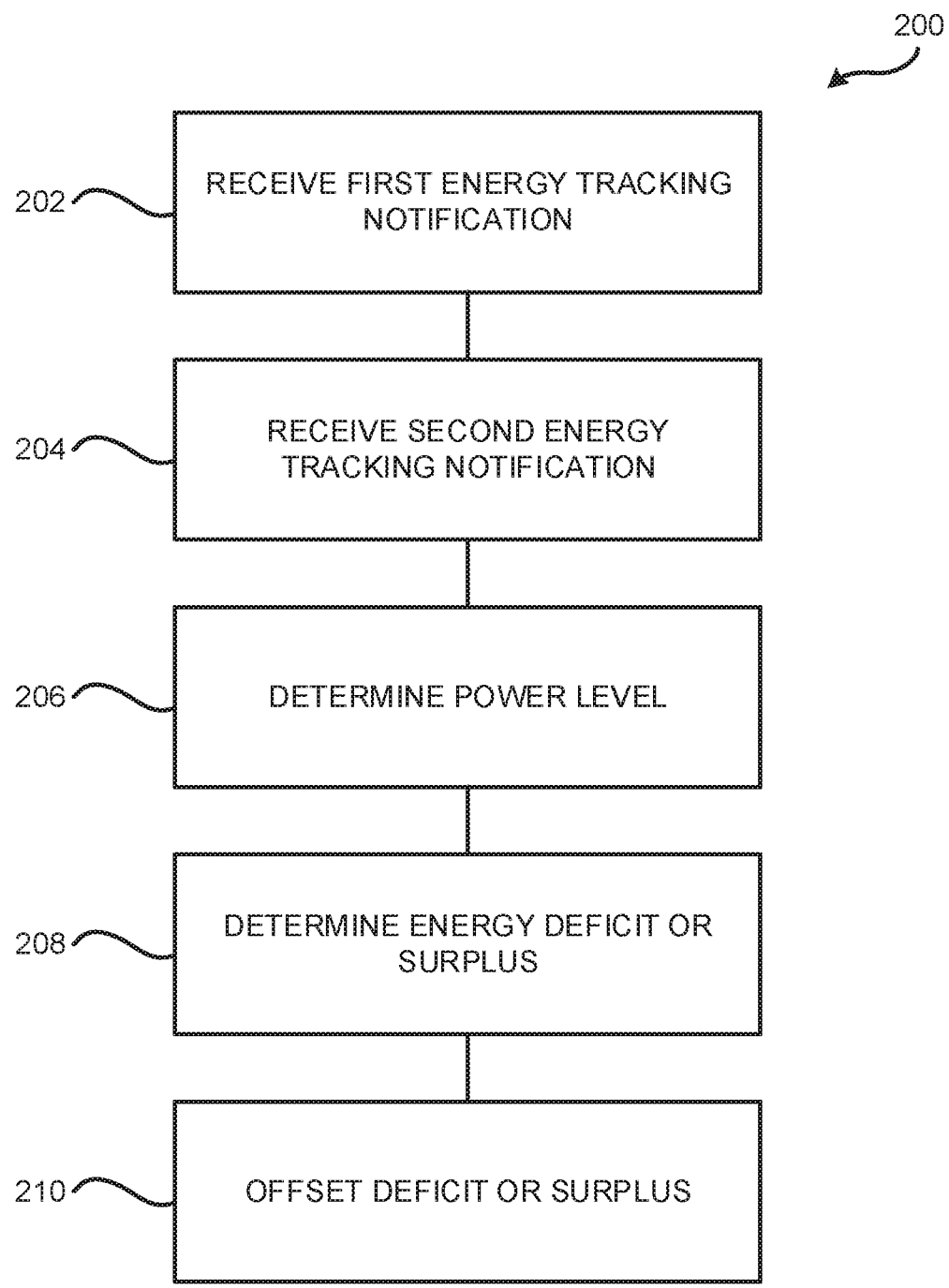
FIG. 4 is a process chart illustrating a method according to the present disclosure.

Operation of the consumption management system 112 within a billing period is explained in detail herein in connection with FIGS. 2-4. FIG. 2 is a timeline diagram illustrating the duration of an electrical utility billing period starting at a starting time $T_A$ and ending at a time $T_B$. The total duration of the billing period therefore spans the length of time between time $T_A$ and time $T_B$. In some embodiments, the duration of the billing period is one month or 30 days, but other durations of time may also be used such as a year, a quarter (3 months), a week, a biweek, or another period of time. The billing period may be the duration of time used to determine a utility customer's bill, such as a bill that includes power-level-based demand charges. Within the billing period, a plurality of subdivisions exist between times $T_A$ and $T_1$, $T_1$ and $T_2$, $T_2$ and $T_3$, etc., until the final subdivision extending from time Tn to time $T_B$.

The plurality of subdivisions may each have a predetermined length. Generally, the subdivisions have equal lengths. For example, each subdivision may comprise a length of 5 minutes, 10 minutes, 15 minutes, 60 minutes, or any other division of time that is less than or equal to the duration of the billing period. Thus, the time between $T_1$ and $T_2$ may correspond to the time between 12:15 p.m. and 12:30 p.m. on one day of the billing period. In some embodiments, there is a single subdivision of the billing period extending from time $T_A$ to time $T_B$. However, utility providers commonly practice assessing demand charges based on a plurality of subdivisions, with one common subdivision duration being 15 minutes. Therefore, a plurality of 15-minute subdivisions within a month-long billing period is used herein for example purposes in explaining the function and operation of the present apparatuses, systems, and methods.

FIG. 3 illustrates a timeline of the duration of time spanning one subdivision of the billing period illustrated in FIG. 2. Specifically, FIG. 3 shows the time spanning between time $T_1$ and time $T_2$ of FIG. 2. Thus, the time between time $T_1$ and time $T_2$ is a fixed amount of time corresponding to the length of the subdivisions of the billing period of FIG. 2. $T_1$ may be referred to as the start time of the subdivision, and $T_2$ may be referred to as the end time of the subdivision. As time passes between time $T_1$ and time $T_2$, the consumer's site (e.g., 100) draws power from the electrical utility distribution grid (e.g., 104). The power drawn (e.g., in kilowatts) over time causes energy (e.g., in kilowatt-hours) to be consumed over time. The utility meter (e.g., 106) may provide a signal (e.g., $S_1$ through $S_{12}$) each time a predetermined amount (i.e., quantum) of energy has been consumed at the site. For example, a signal (i.e., tick) may be provided every time 50 watt-hours of energy have been consumed at the site. That amount of energy may be referred to as the "quantum value" of the site. The utility provider typically sets the quantum value, and the consumer does not have control over the quantum value setting. Accordingly, any number of signals may be provided during a subdivision in the billing period. If energy consumption by loads and the energy storage at the site is low, there will be a very low number or zero energy consumption signals sent during a given subdivision. High consumption by the loads and energy storage may cause the meter to send a large number of signals during the subdivision.

In the billing period subdivision shown in FIG. 3, the signals $S_1$-$S_3$ are provided at a steady pace at the start of the subdivision. This indicates that at least between signals $S_1$ and $S_2$ and between signals $S_2$ and $S_3$, the average power draw of the site from the utility grid is a constant value during those times. If the quantum value of energy is known, the average power draw value during the time between those signals $S_1$-$S_3$ can be established by dividing the amount of energy consumed over that time by the time between the signals. If that average power draw is higher than the setpoint for the billing period (or the setpoint for the subdivision, if applicable), the load curtailment system may be operated to discharge the amount of energy that was exceeded by that power draw across the time between the signals over at least some portion or fraction of the remainder of the subdivision. By offsetting that excess energy, the average power draw over the duration of the subdivision will be at or below the setpoint value, so demand charges for the site will not be increased based on the average consumption of the subdivision. In this manner, the system can manage each of the average power draw values for every subdivision of a billing period and thereby prevent them from exceeding the setpoint. The consumer can then plan for a demand charge (if any) to be no greater than a certain predetermined value at the end of the billing period, based on the setpoint. With a properly designed load curtailment system, the consumer can even reduce or eliminate their demand charges by bringing down the average consumption of all of the subdivisions of the billing period.

Referring again to FIG. 3, there is a longer span of time between signal $S_3$ and signal $S_4$ than between signals $S_2$ and $S_3$. This may indicate that the power draw of the site decreased during that time relative to the time between signals $S_2$ and $S_3$. Accordingly, the load curtailment system may determine that the average power level between the time of signal $S_3$ and the time of signal $S_4$ is lower than the average power level in the time between signals $S_2$ and $S_3$. If that lower power level is below the setpoint, the system controller may allow an energy storage device to charge during at least a portion or fraction of the remainder of the subdivision (e.g., between the time of signal $S_4$ and end time $T_2$), provided that the charging power draw would not then cause the average power draw of the subdivision to exceed the setpoint. Thus, the system may charge the energy storage periodically to ensure that sufficient charge is available for discharging events without driving up the average consumption past the setpoint.

More signals are received by the system controller between the time of signal $S_4$ and the end of the subdivision at time $T_2$. When the signals are received in fast succession, such as between signal $S_5$ and signal $S_9$, the system controller may react by discharging energy storage in a manner proportional to the amount needed to bring the average power draw from time $T_1$ to the time of signal $S_9$ to or below the setpoint. When the signals are received more spaced apart, such as between signal $S_9$ and signal $S_{11}$, the controller may slow the discharging if needed or allow the energy storage to recharge if the average power draw for the subdivision is expected to end up below the setpoint.

Accordingly, as shown in FIG. 3, the consumption information provided to the system controller may comprise a plurality of "energy consumed" or energy tracking signals (e.g., $S_1$ through $S_{12}$ which are only sent after energy has been consumed) rather than a plurality of instantaneous power draw signals (e.g., that show only the present or historical power draw of the site). These energy tracking signals may not comprise quantitative values directed to an amount of energy consumed, but are indicative that a certain amount of energy has been consumed since the last energy tracking signal was sent. Alternatively, the energy tracking signals may indicate a cumulative total energy consumed at the site at the time they are sent.

The average power draw may be calculated using the energy tracking signals without needing to track and react to instantaneous changes to the direct load profile. This may be advantageous because typical inverters operate most efficiently when they operate at full power, whether that operation is drawing power from the grid or providing power to the grid. Thus, rather than using the inverter or other converter to provide an exactly proportional response that mirrors any change to a load profile, the load curtailment system may charge or discharge using the inverter at its full capacity at all times to provide demand charge management without incurring the costs of undue conversion inefficiencies. The inverter may also not be required to react immediately to changes in the power draw of the site. Rather, the inverter may be given much more time, such as the entire remaining time in the subdivision after receiving an energy tracking signal, to start up and provide its charging or discharging function without detrimental effect on the future calculation of the demand charge for the billing period.

FIG. 4 illustrates one example embodiment of the present systems and methods and how they may be used in the context of the present disclosure. A method 200 may comprise receiving a first energy tracking notification at a first time, as shown in block 202. A utility meter may be the source of the first energy tracking notification and may be connected to a utility distribution grid such as grid 104. The utility meter may send the first energy tracking signal at the first time. In some embodiments, the controller may receive the first energy tracking signal from the utility provider or another source via the network 120. Thus, the notification may be an electronic signal received and interpreted by the system controller 114. The utility meter may be a meter used for utility billing such as meter 106. The first energy tracking notification may be received by a computing device (e.g., a system controller 114) at the customer site (e.g., 100) that is managing the power draw of the site from the grid.

In some configurations, the energy tracking notification may be a notification that a quantity of energy (i.e., a quantum value) has been consumed by the site from the utility distribution grid, such as the signal $S_1$ shown in FIG. 3.

In other embodiments, the first energy tracking notification may be a notification of the start of a billing period (e.g., notification that time $T_A$ has been reached) or at the start of a subdivision of a billing period (e.g., notification that time $T_1$ has been reached). Therefore, the first energy tracking notification may be a notification that energy consumption should be tracked from the time it is received (e.g., from time $T_A$ or $T_1$ onward). The meter 106 may provide the signal of the start of a new subdivision or billing period, and in some cases the system controller may receive the signal from a separate clock or timer from the meter.

In some arrangements, the first energy tracking notification may be provided before the start of the billing period or subdivision of the billing period. For example, the first energy tracking notification may be signal $R_1$ in FIG. 3, which is provided prior to time $T_1$.

The method 200 may further comprise receiving a second energy tracking notification from the utility meter at a second time, as shown in block 204. The second energy tracking notification may be received by the system controller 114. The second energy tracking notification may be sent after a quantity of energy is consumed by the customer site from the utility distribution grid. The second energy tracking notification may be received after the first energy tracking notification is received. As explained above, the time between the first and second energy tracking notifications may be variable and dependent upon the power draw of the site and the size of the quantum value of the site that is typically set by the utility provider. Thus, in order to determine whether a load management action needs to be taken, the method 200 may further comprise determining a representative power level of the customer site drawn from the utility distribution grid between the first time and the second time based on the quantum of energy, as indicated in block 206. In one example, the system controller 114 may determine the representative power level. The power level or power draw may be the average power consumed by the site (e.g., in watts) across the time between the first and second times.

Additionally, in some embodiments the first energy tracking notification may be the start time of a subdivision of a billing period (e.g., time $T_1$). In that case, the site may or may not have consumed the quantum value of energy between the first energy tracking notification and the second energy tracking notification. Nevertheless, the system may estimate that the energy consumed between the first and second energy tracking notifications is equal to the quantum value.

The method may be implemented at a location where a setpoint or target power level is predetermined. For example, a load curtailment system at a site may be sized, configured, and optimized to manage a certain predetermined amount of curtailment for that site. An example site could have a system configured to reduce the maximum average power draw by 5 kilowatts (or some other target value), thereby reducing the demand charge billed to the site due to the maximum average load of the subdivisions of the billing period being 5 kilowatts lower than would otherwise have occurred. Accordingly, the method 200 may comprise comparing the power draw based on the first and second energy consumption notifications to determine whether there is an energy surplus or deficit in the billing period. In some embodiments, the surplus or deficit may be determined based on a difference between the representative power level (e.g., the average power level between the energy consumption notifications) and a target power level (e.g., the setpoint for the billing period), as indicated in block 208. In one example, the system controller 114 may determine the energy deficit or surplus.

The method 200 may further comprise operating a load curtailment system to transfer energy to or from the utility distribution grid, wherein the transferred energy offsets the energy surplus or deficit within a billing period, as shown in block 210. In one example, the system controller 114 may perform the transfer of energy to or from the utility distribution grid to offset the energy surplus or deficit. This part of the method 200 may comprise transferring energy from an energy storage system (e.g., 116) to the grid or charging the energy storage system from the grid using an inverter (e.g., 118) or other conversion device. The offset energy may be at least an amount of energy required to eliminate the surplus or to at least partially eliminate the deficit. In some arrangements, the energy transfer may be configured to be performed at the maximum possible transfer rate of any conversion equipment (e.g., inverters) at all times.

The following example embodiment provides one way that a system controller may perform its functions described in method 200. Over time, a plurality of inputs may be provided to the system controller. These inputs may determine the behavior of the system controller as it manages the peak power draw of the site. The relationship of these inputs is provided below. The inputs may comprise:

$E_{deficit}$, which represents the energy deficit of the current demand measuring period/subdivision of the billing period. This value may be provided in kilowatt-hours or equivalent units and may be expressed as a negative number if there is a surplus of energy consumption during the current subdivision;

$E_{newest\ tick}$, which represents the most recent total energy consumption value measured by the meter. This value may be provided in kilowatt-hours or equivalent units and may represent the cumulative energy consumed by the site at the time a quantum value of energy has been consumed by the site;

$E_{initial}$, which represents the cumulative energy measured by the meter at the beginning of the demand measurement period. The time of $E_{initial}$ may vary from case to case, and may be the same as $E_{newest\ tick}$. This value may be provided in kilowatt-hours or equivalent units;

P, which represents the raw power request to the inverter without state-of-charge (SOC) limits on the energy storage and limits on the inverter. A positive value may represent charging the energy storage, and a negative value may represent discharging the energy storage. This value may be provided in kilowatts or equivalent units;

$T_{length}$, which represents the total length of demand measurement period/the current subdivision of the billing period;

$T_{newest\ tick}$, which represents the time at which the most recent energy tick measurement signal has been received by the controller;

$T_{initial}$, which represents the time of the last energy tick in the previous demand measurement period. $T_{initial}$ may vary according to the operating scheme used at the site, as explained in further detail below;

$T_{current}$, which represents the current time;

SP, which represents the peak shaving setpoint. This value may be provided in kilowatts or equivalent units. The setpoint may be the value used by the utility to determine a demand charge of the site at the end of the billing period. Alternatively, the setpoint may be a power value that the customer does not wish to exceed for reasons other than incurring demand charges, such as, for example, a power value that when exceeded may cause damage to electrical components or connections at the site; and α, which represents a tuning parameter having a value greater than 0 and less than or equal to 1. This parameter may define how much of the remaining time in the subdivision of the billing period that the controller should use to offset $E_{deficit}$. For example, if α=0.5, then the value of P will be set to erase any energy deficit or surplus in half of the timer remaining in the subdivision of the billing period. A value of 1 for α may be the least aggressive setting that allows the system to take the entire remaining time of the demand measurement period to remove the energy deficit, while a value close to 0 will make the system try to remove the energy deficit as soon as possible. The optimal tuning parameter a for each site may be dependent on site characteristics such as demand profile and demand sources, and will require individual tuning for every site. In some embodiments, however, the value of a may be at least about 0.2 in order to avoid aggressive cycling of the inverter.

Using the inputs described above, the controller may implement the following logic. The following logic is provided as an example and should not be viewed as limiting the types of operations that may be used to achieve the purposes and perform the functions of the controller.

The controller may determine the energy deficit (or surplus) as follows:

$$E_{deficit} = E_{newest\ tick} - E_{initial} - SP^*(T_{newest\ tick} - T_{initial}) \quad \text{[Equation 1]}$$

The controller may follow the following logic with the energy deficit (or surplus). The power P may be determined as:

$$P = -E_{deficit}/(\alpha^*(T_{length} - T_{newest\ tick} + T_{initial}), \quad \text{[Equation 2]}$$

wherein if $$(E_{deficit} > 0) \text{ and } (-E_{deficit} < (P^*(T_{current} - T_{newest\ tick}))), \quad \text{[Equation 3]}$$

then P=0 (in order to prevent the system from over-discharging if the site's energy consumption is so low that the ticks cease to occur), and if $$(E_{initial} = E_{newest\ tick}), \quad \text{[Equation 4]}$$

then P=0 (in order to prevent the system from automatically attempting to charge the energy storage at the beginning of each subdivision of the billing period).

This controller logic may work well when a reasonably sized quantum value is used for the metering device. This may not be the case, so a maximum threshold for the quantum value (relative to typical site consumption rates) may be implemented, beyond which a site will not meet the criteria for achieving reasonable peak shaving/load management performance. For example, if the quantum value only allows for one or two energy tracking notification signals to be received by the controller in a subdivision of a billing period even though there is high power draw, the site may not be a good candidate for the present systems and methods. In some embodiments, the quantum value threshold may therefore be one tenth or less of the subdivsion's energy consumption during critical (e.g., high-power-draw) hours.

In some configurations, the controller's logic may detect and prevent back feeding of energy into the grid. The determination of Equation 3 shown above may help to address this issue given an energy tick-based measurement scenario. Using Equation 3, the controller may automatically stop discharge once the battery has discharged enough energy to completely remove the energy deficit calculated with the most updated energy values. The sensitivity of the control logic to back feeding may be directly correlated to the size of the quantum value, so more stringent criterion may have to be enforced if there are strict requirements imposed by a utility or customer against back feeding. If all types and degrees of back feeding are forbidden at a site, more equipment may be installed for instantaneous monitoring of site power levels.

The controller logic may operate under an assumption that the setpoint is set correctly, and therefore will operate the battery with maximum effort (i.e., maximum energy transfer rates) until hitting internal state-of-charge (SOC) thresholds for the energy storage system. The controller may not have the ability to affect the curtailment value, as that would erode the authority of an associated curtailment generation service (CGS) and may confound curtailment calculation inputs, which may ultimately yield lower performing curtailment values. Instead, the system controller may be designed to provide signals on system resource health to the CGS, such as frequency of reaching critically low SOC ranges.

In one embodiment, the value of $T_{initial}$ may be equal to $T_0$, where $T_0$ represents the starting time of the subdivision of the billing period in question. In FIG. 3, $T_{initial}$ would be at time $T_1$. In this case, the site may enter a new subdivision/energy measurement period when it has consumed almost a full quanta's worth of energy. For example, in FIG. 3, time $T_1$ may be right before the time at which signal $R_2$ is received, assuming that $R_2$ is the first quantum value signal received in the subdivision (and received prior to signal $S_1$). Therefore, the controller may determine that there has been a spike in energy deficit between $T_0$ and the first signal tick even if the power draw is not particularly high between the two most recent ticks (i.e., between the times of signals $R_1$ and $R_2$). Also, this means that the calculated energy surplus may be smaller than would actually exist or the calculated energy deficit may be larger than would actually exist. In other words, using $T_{initial}$ as $T_0$ may inflate $E_{deficit}$ and may deflate $E_{surplus}$.

In a second embodiment, $T_{initial}$ may be equal to time of the most recent tick signal in the previous subdivision of the billing period before $T_0$. In FIG. 3, $T_{initial}$ would therefore be the time at which signal $R_1$ is received. This embodiment would be likely to inflate $E_{deficit}$ and inflate $E_{surplus}$. However, this format may be beneficial to adopt for consumers since it has a predictable effect on both $E_{deficit}$ and $E_{surplus}$ and is therefore a conservative option that can be accounted for by engineering a system that is configured to handle any error introduced by the inflation of the deficit or surplus. For example, the setpoint for the site may be increased (relative to a setpoint optimally based on perfect instantaneous consumption power measurements) or the controller may be configured to over-correct surplus or deficit values in a manner overcoming any error introduced by $T_{initial}$.

In a third embodiment, $T_{initial}$ is the time of the first tick in the present subdivision of the billing period. In FIG. 3, $T_{initial}$ would therefore be the time at which signal $S_1$ is received. This operating scheme may have various unpredictable effects, and it could inflate or deflate both $E_{deficit}$ and $E_{surplus}$ since any consumption that occurs between time $T_0$ and the time of the first tick (e.g., $S_1$) may be ignored. If there is a large spike in consumption between $T_0$ and the time of the first tick, the average power draw of the subdivision may be much higher than would be estimated by the controller. Those having skill in the art will be able to determine which embodiment of $T_{initial}$ is best suited for the needs of each particular site.

Figure 5:
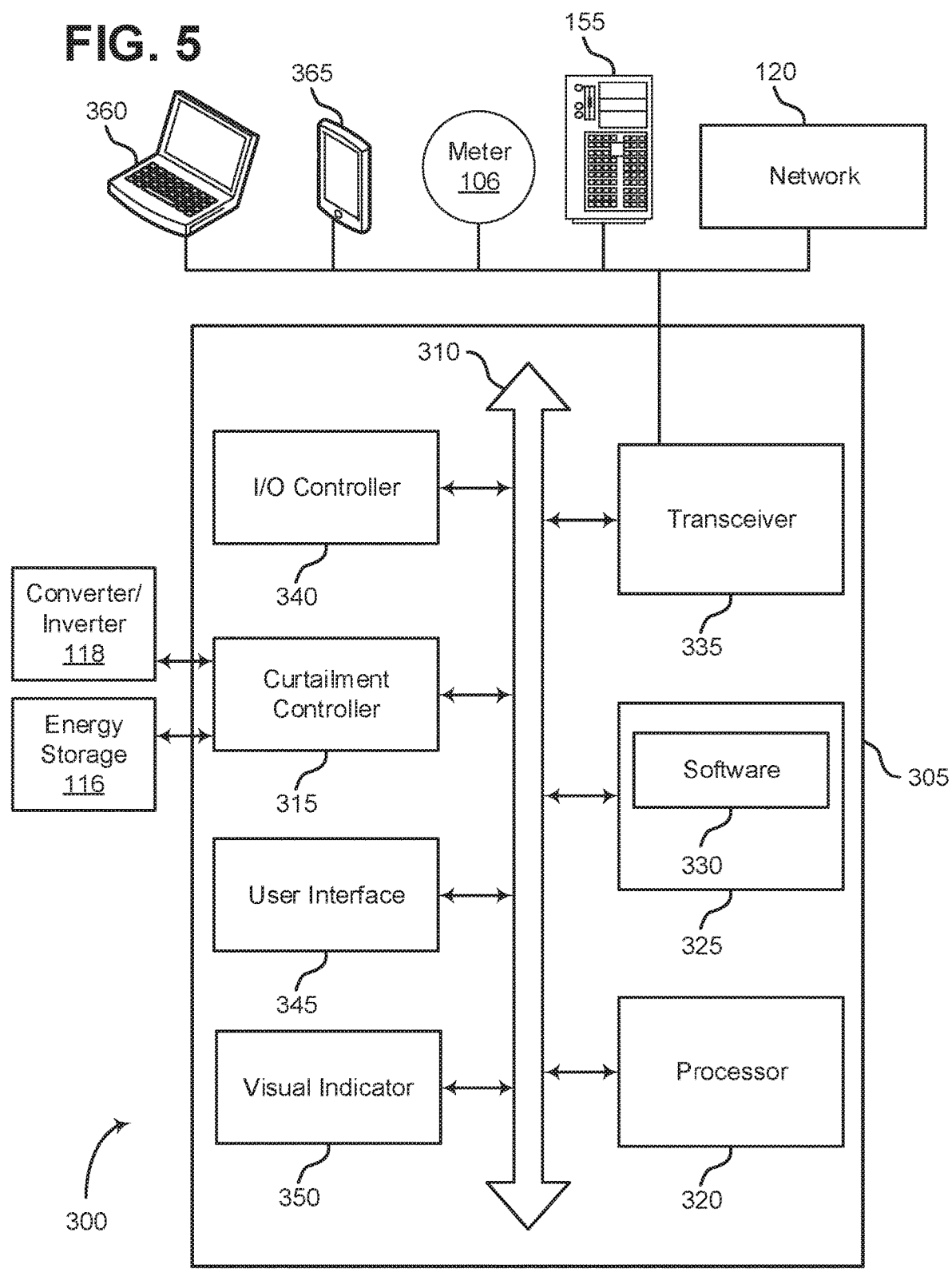
FIG. 5 is a schematic diagram of a system and apparatus that may be used as part of embodiments of the present disclosure.

FIG. 5 shows a diagram of a system 300 including a device 305 that may be used as part of the system controller 114 in accordance with various aspects of the present disclosure. Device 305 may be an example of or include the computing and connective components of the system controller 114, as described above, e.g., with reference to FIG. 1. Device 305 may include components for bi-directional voice and data communications including components for transmitting and receiving communications, including curtailment controller 315, processor 320, memory 325, software 330, transceiver 335, I/O controller 340, user interface 345, and visual indicator 350. These components may be in electronic communication via one or more busses (e.g., bus 310).

In some cases, device 305 may communicate with a remote storage device, and/or a remote server (e.g., server 155). For example, one or more elements of device 305 may provide a direct connection to a remote server via a direct network link to the Internet via a POP (point of presence). In some embodiments, one element of device 305 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of system 300 (e.g., cell radio module, battery, utility equipment monitor, and so on). In some embodiments, all of the elements shown in FIG. 5 need not be present to practice the present systems and methods. The devices and subsystems may also be interconnected in different ways from that shown in FIG. 5. In some embodiments, aspects of the operations of system 300 may be readily known in the art and are not discussed in detail in this disclosure.

The signals associated with system 300 may include wireless communication signals such as radio frequency, electromagnetics, LAN, WAN, VPN, wireless network (using 802.11, for example), 345 MHz, Z-WAVE®, cellular network (using 3G and/or Long Term Evolution (LTE), for example), and/or other signals. The radio access technology (RAT) of system 300 may be related to, but are not limited to, wireless wide area network (WWAN) (GSM, CDMA, and WCDMA), wireless local area network (WLAN) (including BLUETOOTH® and Wi-Fi), WiMAX, antennas for mobile communications, antennas for Wireless Personal Area Network (WPAN) applications (including radio frequency identification devices (RFID) and UWB). In some embodiments, one or more sensors (e.g., current or voltage sensors, ammeters, volt meters, magnetic sensors, and/or other sensors) may be connected to some elements of system 300 via a network using the one or more wired and/or wireless connections.

Processor 320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 320 may be configured to operate a memory array using a memory controller. In other cases, a memory controller may be integrated into processor 320. Processor 320 may be configured to execute computer-readable instructions stored in a memory to perform various functions (e.g., functions or tasks supporting a thermostat with downcast light).

Memory 325 may include RAM and ROM. The memory 325 may store computer-readable, computer-executable software 330 including instructions that, when executed, cause the processor to perform various functions described herein. In some cases, the memory 325 may contain, among other things, a basic input/output system (BIOS) which may control basic hardware and/or software operation such as the interaction with peripheral components or devices. In some embodiments, the memory 325 may be part of a non-transitory computer-readable medium that is separable from the device 305, such as, for example, a CD-ROM, DVD-ROM, flash memory drive, and other similar data storage devices.

Software 330 may include code to implement aspects of the present disclosure, including code to support operation of a system controller for energy-based load management. Software 330 may be stored in a non-transitory computer-readable medium such as system memory or other memory. In some cases, the software 330 may not be directly executable by the processor but may cause a computer (e.g., when compiled and executed) to perform functions described herein. For example, the software 330 may be configured to perform the methods described in connection with FIG. 4.

Transceiver 335 may communicate bi-directionally, via one or more antennas, wired, or wireless links as described above. For example, the transceiver 335 may represent a wireless transceiver and may communicate bi-directionally with another wireless transceiver. The transceiver 335 may also include a modem to modulate the packets and provide the modulated packets to the antennas for transmission, and to demodulate packets received from the antennas. The transceiver 335 may communicate bi-directionally with external computing devices 360 and 365, remote computing devices (via connection to network 120), one or more utility meter 106, a server 155, one or more building management systems and utility monitoring services, or combinations thereof.

I/O controller 340 may manage input and output signals for the device 305. I/O controller 340 may also manage peripherals not integrated into the device 305. In some cases, I/O controller 340 may represent a physical connection or port to an external peripheral. In some cases, I/O controller 340 may utilize an operating system such as iOS®, ANDROID®, MS-DOS®, MS-WINDOWS®, OS/2®, OS-X®, UNIX®, LINUX®, or another known operating system. In other cases, I/O controller 340 may represent or interact with a modem, a keyboard, a mouse, a touchscreen, or a similar device. In some cases, I/O controller 340 may be implemented as part of a processor. In some cases, a user may interact with device 305 via I/O controller 340 or via hardware components controlled by I/O controller 340. In some arrangements, an external computing device 360, 365 may be used to interact with the device 305.

User interface 345 may enable a user to interact with device 305. In some embodiments, the user interface 345 may include an audio device, such as an external speaker system, an external display device such as a display screen, and/or an input device (e.g., remote control device interfaced with the user interface 345 directly and/or through the I/O controller module).

The curtailment controller 315 may provide a connection to an inverter 118 and energy storage 116. Thus, information about the status of the inverter 118 (e.g., its power level, health, temperature, and other status information) and the status of the energy storage 116 (e.g., its state of charge (SOC), voltage, temperature, cycle count, and other status information) may be communicated to the device 305. The curtailment controller 315 may also provide a control interface with the inverter 118 and energy storage 116 to perform the functions of the device 305 and system controllers described herein.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A method, comprising:
   receiving a first energy tracking notification from a utility meter at a customer site at a first time, the utility meter being connected to a utility distribution grid;
   receiving a second energy tracking notification from the utility meter at a second time, the second energy tracking notification being sent as a result of a predetermined quantum amount energy being consumed by the customer site from the utility distribution grid since the first time;
   determining a representative power level of the customer site drawn from the utility distribution grid between the first time and the second time based on the quantum amount of energy;
   determining an energy surplus or deficit for the customer site corresponding to a time interval extending from the first time to the second time, the energy surplus or deficit being based on a difference between the representative power level and a target power level for the time interval;
   operating a load curtailment system to transfer energy to or from the utility distribution grid, wherein the energy transferred offsets the energy surplus or deficit within a subdivision of a billing period, wherein the load curtailment system is charged or discharged over a fixed percentage of a remaining time between the second time and an end of the subdivision of the billing period, the fixed percentage being less than 100 percent of the remaining time; and preventing the energy storage from automatically charging by resetting operation of the load curtailment system at a start of each subdivision of the billing period.

2. The method of claim 1, wherein the representative power level is an average power level drawn by the customer site between the first time and the second time.

3. The method of claim 1, wherein the first and second energy tracking notifications are received within the subdivision of the billing period.

4. The method of claim 3, wherein the subdivision has a duration of 15 minutes or less.

5. The method of claim 1, wherein the load curtailment system comprises an energy storage device.

6. The method of claim 1, further comprising:
tracking a duration of transferring energy to or from the utility distribution grid using the load curtailment system;
stopping the energy transfer once the energy deficit or surplus should have been eliminated via the energy transfer.

7. The method of claim 1, wherein operating the load curtailment system comprises transferring energy at a single power level until the energy transferred offsets the energy surplus or deficit.

8. The method of claim 1, wherein the first energy tracking notification is received prior to a start time of the subdivision of the billing period.

9. The method of claim 1, wherein the first energy tracking notification is received after a start time of the subdivision of the billing period.

10. The method of claim 1, wherein the fixed percentage is at least about 20 percent of the remaining time between the second time and an end of the subdivision of the billing period.

11. The method of claim 1, wherein the quantum amount of energy is no greater than an amount of energy consumed at the target power level over one tenth of a total duration of the subdivision of the billing period.

12. A non-transitory computer-readable medium storing code for controlling a load curtailment system, the code comprising instructions executable by a processor to:
receive a first energy tracking notification from a utility meter at a customer site at a first time, the utility meter being connected to a utility distribution grid;
receive a second energy tracking notification from the utility meter at a second time, the second energy tracking notification being sent in response to a quantity of energy being consumed by the customer site from the utility distribution grid since the first time, the quantity of energy being predetermined by the utility provider;
determine a representative power level of the customer site drawn from the utility distribution grid between the first time and the second time based on the quantity of energy;
determine an energy surplus or deficit for the customer site corresponding to a time interval extending from the first time to the second time, the energy surplus or deficit being based on a difference between the representative power level and a target power level for the time interval;
operate a load curtailment system to transfer energy to or from the utility distribution grid, wherein the energy transferred offsets the energy surplus or deficit within a predetermined proportion of a remaining time in a subdivision of a billing period between the second time and an end time of the subdivision, the proportion being less than the entire remaining time; and
prevent the energy storage from automatically charging by resetting operation of the load curtailment system at a start of each subdivision of the billing period.

13. The non-transitory computer-readable medium of claim 12, wherein the representative power level is an average power level drawn by the customer site between the first time and the second time.

14. The non-transitory computer-readable medium of claim 12, wherein the first and second energy tracking notifications are received within the subdivision of the billing period.

15. The non-transitory computer-readable medium of claim 14, wherein the subdivision of the billing period has a duration of 15 minutes or less.

16. The non-transitory computer-readable medium of claim 12, wherein operating the load curtailment system comprises transferring energy at a single power level until the transferred energy offsets the energy surplus or deficit.

17. The non-transitory computer-readable medium of claim 12, wherein the first energy tracking notification is received prior to a start time of the subdivision of the billing period.

18. The non-transitory computer-readable medium of claim 12, wherein the first energy tracking notification is received after a start time of the subdivision of the billing period.

19. An apparatus for controlling a load curtailment system, the apparatus comprising a processor, memory in electronic communication with the processor and instructions stored in the memory, the instructions being executable by the processor to:
receive a first energy tracking notification from a utility meter at a customer site at a first time, the utility meter being connected to a utility distribution grid;
receive a second energy tracking notification from the utility meter at a second time, the second energy tracking notification being sent as a result of a utility-provider-determined quantum value of energy being consumed by the customer site from the utility distribution grid since the first time;
determine a representative power level of the customer site drawn from the utility distribution grid between the first time and the second time based on the quantum value of energy;
determine an energy surplus or deficit based on a difference between the representative power level and a target power level over a duration of time extending from the first time to the second time in which the quantum value of energy is consumed;
operate a load curtailment system to transfer energy to or from the utility distribution grid, wherein the energy transferred offsets the energy surplus or deficit within a subdivision of a billing period;
wherein the load curtailment system is charged or discharged over a fixed percentage of a remaining time between the second time and an end of the subdivision of the billing period, the fixed percentage being less than 100 percent of the remaining time; and
prevent the energy storage from automatically charging by resetting operation of the load curtailment system at a start of each subdivision of the billing period.

20. The apparatus of claim 19, wherein the representative power level is an average power level drawn by the customer site between the first time and the second time.

21. The apparatus of claim 19, wherein the apparatus is configured to receive the first and second energy tracking notifications within the subdivision of the billing period.

22. The apparatus of claim 21, wherein the subdivision of the billing period has a duration of 15 minutes or less.

23. The apparatus of claim 19, wherein operating the load curtailment system comprises transferring energy at a single power level until the transferred energy offsets the energy surplus or deficit.

24. The apparatus of claim 19, wherein the first energy tracking notification is received prior to a start time of the subdivision of the billing period.

25. The apparatus of claim 19, wherein the first energy tracking notification is received after a start time of the subdivision of the billing period.

* * * * *